July 18, 1933.   H. C. ENGELHARDT   1,918,690
ELECTRICAL MOTOR
Filed June 21, 1928
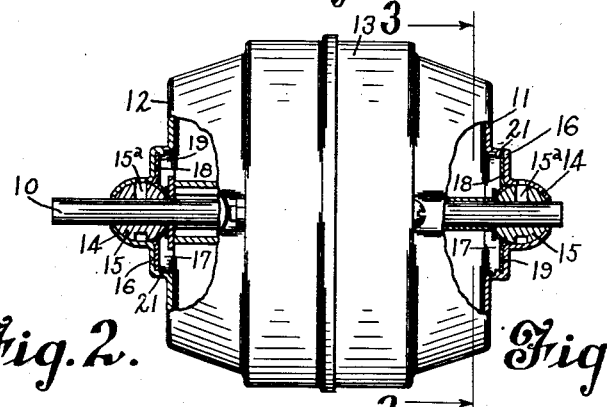
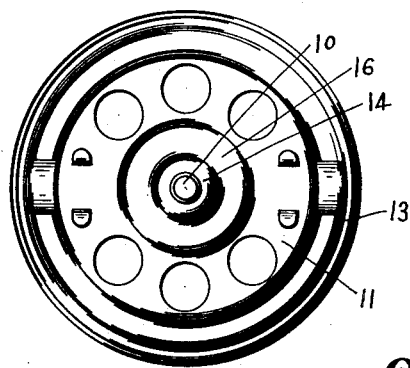 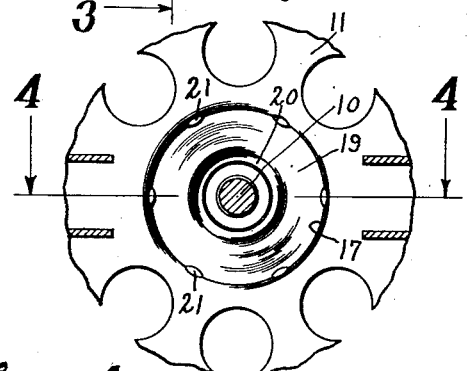
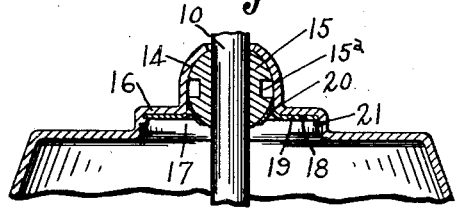
Inventor
Henry C. Englehardt
By Rockwell & Bartholow
Attorneys Patented July 18, 1933

1,918,690

UNITED STATES PATENT OFFICE

HENRY C. ENGELHARDT, OF HAMDEN, CONNECTICUT, ASSIGNOR TO THE A. C. GILBERT COMPANY, OF NEW HAVEN, CONNECTICUT

ELECTRICAL MOTOR

Application filed June 21, 1928. Serial No. 287,130.

This invention relates to electric motors, and more especially to an improvement in small electric motors of the portable type, which are suitable for use as fan motors, toy motors, and for operating small mechanical devices, such as beaters, mixers, polishers, vacuum cleaners, etc. A demand for motors, adapted for such uses is rapidly increasing, and economy in the manufacture of the same without decreasing the efficiency thereof is one of the principal requirements in order that a ready market may be found for the product.

The principal object of this invention is to improve the structure of an electric motor and especially the armature shaft supporting means so that a reduction in the cost of manufacturing motors of the above type will be obtained, without affecting the operating efficiency thereof.

Another object of this invention is to provide an inexpensively constructed bearing member for an electric motor armature shaft or the like.

Further objects of this invention are to provide improved means for retaining a bearing member to its support, and efficient means to secure this retaining means to the bearing support.

To these and other ends, the invention consists in the novel features and combinations of parts to be hereinafter described and claimed.

In the accompanying drawing:

Fig. 1 is an elevational view of an electric motor embodying the features of this invention, and which is partly broken away in order to illustrate the uses for the features of this invention;

Fig. 2 is an end view of the motor shown in Fig. 1;

Fig. 3 is an enlarged sectional view on line 3—3 of Fig. 1, and

Fig. 4 is a sectional view on line 4—4 of Fig. 3.

Although the drawing illustrates certain of the features of this invention applied to an electric motor, it is to be understood that the same may be used in structures other than an electric motor and that such other uses are contemplated. In its broader aspect, the invention comprises a rotatable shaft 10, illustrated in the drawing as an electric motor armature shaft which extends from one end plate 11 to and beyond the other end plate 12, in this instance, of an electric motor casing 13, wherein it supports an armature of any well known type (not shown), for rotation between any well known form of field magnets.

A hollow bearing support 14 is provided at each of the end plates 11 and 12 of the casing 13, the interior of which substantially forms a hemispherical socket wherein a bearing member 15 is disposed. The bearing member 15, in this instance, is in the form of a sphere. The members 15 are provided with shaft receiving openings and suitable oil channels 15$^a$ communicating therewith. Preferably the bearing members 15 are fitted within the supports 14 in such a manner that a slight rocking movement therebetween is permitted, so as to assist in aligning the shaft between the supports. The supports 14 are formed about the outer ends of the members 15 and are provided with an opening to permit the shaft 10 to extend therethrough.

A circular hollow boss 16 of larger diameter than the support 14, is provided in the material of each end plate 11 and 12, whereby a circular recess 17 is formed. Although shown and described as being circular, the boss 16 and recess 17 are not necessarily limited to this shape, but could be of square or other form. The recess 17 is in communication with the interior of the support 14, in this instance being concentric therewith. The interior end surface of the recessed boss 16, therefore, forms an inwardly directed shoulder 18, which encircles the inwardly directed opening in the support 14. Seated against the shoulder 18 is a plate 19, which is shaped at its center as at 20, to conform to the adjacent surface of the member 15, so as to press evenly thereagainst to support it at its inner end. The plate 19 is preferably formed from a stamping of sheet metal, which is slightly resilient and, therefore, when it is in the above position the member 15 is urged into the interior of the support 14 and retained in frictional engagement therewith. The plate 19 disclosed in the drawing, is in the form of a circular disk and fits within the recess 17.

In order to obtain the maximum use of the resiliency of the plate 19, it is preferably secured to the inner end surface of the boss 16 against the shoulder 18, or the inner surface of the end plates 11 and 12, by suitable means which will retain it thereon by engagement with the outer edges of the plate, whereby the center portion thereof will be free to resiliently act upon the bearing member 15, as above described.

In the embodiment illustrated, the means to so secure the plate 19, comprises a plurality of lugs 21 which are struck from the material of the side walls of the recess 17 and forced into clamping engagement with and upon the surface of the plate 19, closely adjacent its edges or, in this instance, its peripheral edge. The lugs 21 secure the plate 19 at its edges in the recess 17 against the shoulder 18 and insure that the central portion 20 thereof will resiliently press against the member 15 to frictionally retain it within the support 14.

The operation of forming the lugs 21 being a relatively inexpensive one, considerable saving in the cost of forming and assembling this part of the motor or similar structure is obtained when compared with other forms of bearing structures, especially those wherein rivets or bolts are used. As is obvious, the results obtained by such a structure are exceptionally efficient and useful.

While I have shown and described a preferred embodiment of my invention, it is understood that it is not to be limited to all of the details shown, but is capable of modification and variation which will lie within the spirit of the invention and the scope of the appended claims.

What I claim is:

1. In a bearing structure, a hollow bearing support, a bearing member disposed within said support, and means to constantly urge said member toward said support, comprising a plate of resilient material, and means comprising parts of the material of said support engaging the outer peripheral edge of said plate at spaced apart points thereabout to secure said plate to said support.

2. In a shaft bearing, a support, a hollow bearing boss formed in said support, a bearing member disposed within said boss, said support having a recessed portion provided about said hollow boss, and a plate disposed in the recessed portion and having a resilient portion engaging said bearing member to urge it into said boss, and means formed from peripherally spaced apart parts of the material of the walls of the recessed portion overlapping and engaging the outer edge surface of said plate to retain said plate therein.

3. In a bearing structure, a support, a hollow bearing boss formed in said support, a bearing member disposed within said hollow boss, said support having a recessed portion provided about said hollow boss, and a resilient plate disposed in the recessed portion, said plate at its center portion engaging an end of said bearing member to urge it axially toward and to retain it in said boss, and a plurality of lugs formed by forcing a part of the wall of the recessed portion toward and in overlapping relation with the outer edge surface of said plate to secure it to said support.

4. In a shaft bearing, a sheet metal support having a socket therein, a bearing member in said socket with one end thereof seated therein and a plate of resilient material disposed over the open end of said socket, with the center portion thereof in engagement with an end of said bearing member, and lugs struck from the material of said support at spaced intervals about the periphery of said plate and pressed into engagement with the same to force said plate toward and into pressing engagement with said bearing member.

5. In a shaft bearing, a sheet metal support having a socket therein, and a cylindrical recess concentric with said socket, a bearing member in said socket with one end thereof seated therein, and a circular plate of resilient material disposed in said recess and over the open end of said socket with a center portion thereof in pressing engagement with an end of said bearing member, and lugs struck from the material of the side wall of said recess in said support and at spaced intervals about the periphery of said plate engaging the same to press it into said recess and to retain it in pressing engagement with said bearing member.

6. A shaft bearing comprising a substantially spherical bearing member having a shaft receiving opening therethrough, a support for said bearing member in the form of a plate-like member adapted for use as the end plate of a casing, a substantially spherical hollow boss extending outwardly from said supporting member to receive said bearing member, a substantially cylindrical recess formed in said supporting member with its axis in alignment with the axis of said hollow boss and providing an inwardly facing shoulder about said hollow boss and having side walls about its periphery, a disk disposed in the recess and seated against said shoulder formed thereby, said disk having a resilient portion engaging the inner end of said bearing member to retain it in said hollow boss, and peripherally spaced apart lugs struck from the side walls of the aforesaid recess and forced into pressing engagement with said disk at its periphery to retain it in position against said shoulder and said resilient portion of said disk in engagement with said bearing member.

HENRY C. ENGELHARDT.